United States Patent
Hong et al.

(10) Patent No.: US 11,134,373 B2
(45) Date of Patent: Sep. 28, 2021

(54) METHOD FOR NAMING STK MODULE, COMMUNICATION TERMINAL AND DEVICE HAVING STORAGE FUNCTION

(71) Applicant: HUIZHOU TCL MOBILE COMMUNICATION CO., LTD., Huizhou (CN)

(72) Inventors: Yangning Hong, Huizhou (CN); Donghai Wu, Huizhou (CN); Hanwu Xie, Huizhou (CN); Zubin Chen, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/480,307

(22) PCT Filed: Jul. 13, 2018

(86) PCT No.: PCT/CN2018/095566
§ 371 (c)(1),
(2) Date: Jul. 23, 2019

(87) PCT Pub. No.: WO2019/011312
PCT Pub. Date: Jan. 17, 2019

(65) Prior Publication Data
US 2019/0373451 A1    Dec. 5, 2019

(30) Foreign Application Priority Data

Jul. 14, 2017    (CN) .......................... 201710574372.9

(51) Int. Cl.
*H04W 4/14*    (2009.01)
*H04W 4/50*    (2018.01)
(Continued)

(52) U.S. Cl.
CPC ............... *H04W 8/24* (2013.01); *H04W 4/14* (2013.01); *H04W 4/50* (2018.02); *H04W 4/60* (2018.02); *H04W 8/183* (2013.01)

(58) Field of Classification Search
CPC ........... H04W 4/14; H04W 4/50; H04W 4/60; H04W 8/183; H04W 8/24
See application file for complete search history.

(56) References Cited

U.S. PATENT DOCUMENTS

2014/0344083 A1* 11/2014 Rosenes ................ H04M 17/02
705/17

FOREIGN PATENT DOCUMENTS

| CN | 101287233 A | 10/2008 |
| CN | 101835142 A * | 9/2010 |

(Continued)

OTHER PUBLICATIONS

ETSI TS 151 013 V5.7.0 (Oct. 2013) Digital cellular telecommunications system (Phase 2+); Test specification for Subscriber Identity Module (SIM) Application Programming Interface (API) for Java Card (3GPP TS 51.013 version 5.7.0 Release 5) (Year: 2013).*

(Continued)

*Primary Examiner* — Melvin C Marcelo
*Assistant Examiner* — Natali Pascual Peguero

(57) ABSTRACT

The present disclosure may provide a method of naming an STK module, which may include: after starting a system of a communication terminal, reading text information of a SIM card and saving the same as a first variable, wherein the text information may include SET UP MENU alphaID or EF_SUME; uninstalling an STK module; and re-installing the STK module and naming the STK module using the first variable. By means of the foregoing solution, and the STK module of which the name has a word of "SIM card" after (Continued)

After a system of a communication terminal is started, reading text information of a SIM card and saving the text information as a first variable — S101

Re-installing an STK module, and naming the STK module with the first variable — S102 starting the communication terminal system may be renamed using the first variable. The present disclosure may further provide a communication terminal, which can execute the foregoing method. Still further, the present disclosure may provide an apparatus having a storage function, which stores program data, and the program data may be executed to implement the foregoing method.

14 Claims, 2 Drawing Sheets

(51) Int. Cl.
*H04W 4/60* (2018.01)
*H04W 8/18* (2009.01)
*H04W 8/24* (2009.01)

(56) References Cited

FOREIGN PATENT DOCUMENTS

| | | |
|---|---|---|
| CN | 101835142 A | 9/2010 |
| CN | 102572077 A | 7/2012 |
| CN | 102572800 A | 7/2012 |
| CN | 106231591 A | 12/2016 |
| CN | 107613486 A | 1/2018 |
| WO | WO2013068792 A1 | 5/2013 |
| WO | WO2013068792 A1 | 9/2014 |

OTHER PUBLICATIONS

International Search Report of PCT/CN2018/095566.
Chinese First Office Action, Chinese Application No. 201710574372.9, dated Mar. 2, 2020 (7 pages).
European search report, European Application No. 18831815.8, dated Mar. 30, 2020 (5 pages).

* cited by examiner

METHOD FOR NAMING STK MODULE, COMMUNICATION TERMINAL AND DEVICE HAVING STORAGE FUNCTION

CROSS REFERENCE TO RELATED APPLICATIONS

The present application is a 35 U.S.C. § 371 National Phase conversion of International (PCT) Patent Application No. PCT/CN2018/095566 filed on Jul. 13, 2018, which claims foreign priority of Chinese Patent Application No. 201710574372.9, filed on Jul. 14, 2017, in China National Intellectual Property Administration, the contents of all of which are hereby incorporated by reference.

TECHNICAL FIELD

The present disclosure relates to the field of communication technology, and in particular to a method for naming a subscriber identification module (SIM) tool kit (STK) module, a communication terminal, and a device having a storage function.

BACKGROUND

STK is software of a small type of programming language, which may be solidified in a SIM card. The STK may receive and send message data, functioning as an interface for message transmission between the SIM cards, and allow the SIM card to run applications of the SIM card itself. An STK card is similar to the SIM card, which may be used on a mobile phone, but being different from the SIM card, the STK card may have large memory space, so that the STK card may be widely used in the fields of mobile banking service, stock exchange, forex and the like, and has become a necessary card for a smart mobile phone. On a user interface, STK may generate a service menu to make it user friendly.

With development of mobile internet, mobile phones have been popularized, and competitions among operators have become increasingly fierce. Currently, names of functional entry menus of STK on a mobile phone may contain key words of "SIM card", for example, a SIM card tool kit, SIM card applications and the like. Providing a distinctive name of an entry menu of the STK module for users has become competition tactic of operators to broaden their product features.

SUMMARY OF THE DISCLOSURE

An embodiment of the present disclosure includes a method for naming an STK module, a communication terminal and a device having storage functions, so that the STK module may be renamed based on demands of operators.

An embodiment of the present disclosure includes a method for naming an STK module, wherein the method may include the following operations. After a system of a communication terminal is started, text information of a SIM card may be read and saved as a first variable, wherein the text information may include SET UP MENU alphaID or EF_SUM.

The STK module may be uninstalled.

The STK module may be reinstalled and renamed using the first variable.

Another embodiment of the present disclosure includes a communication terminal, which may include: a processor and an interface circuit, wherein the processor may be coupled with the interface circuit, and, during operation, the processor may cooperate with the interface circuit to execute instructions to perform actions including the following. After a system of the communication terminal is started, text information of a SIM card may be read and saved as a first variable.

An STK module may be uninstalled firstly followed by re-installation, and re-named using the first variable.

Another embodiment of the present disclosure includes an apparatus having a storage function with program data stored therein, wherein the program data may be executed to perform the following actions. After a system of a terminal is started, text information of a SIM card may be read and stored as a first variable.

An STK module may be uninstalled firstly followed by re-installation, and re-named using the first variable.

After a system of a terminal is started, text information of a SIM card may be read and saved as a first variable, an STK module may be un-installed firstly followed by re-installation, and the STK module of which the name has a word of "SIM card" after starting the communication terminal system may be renamed using the first variable. In such a way, operators may name the STK module with any characters by their choosing.

DETAILED DESCRIPTION

The present disclosure will be described in detail herein with the appended figures.

Figure 1:
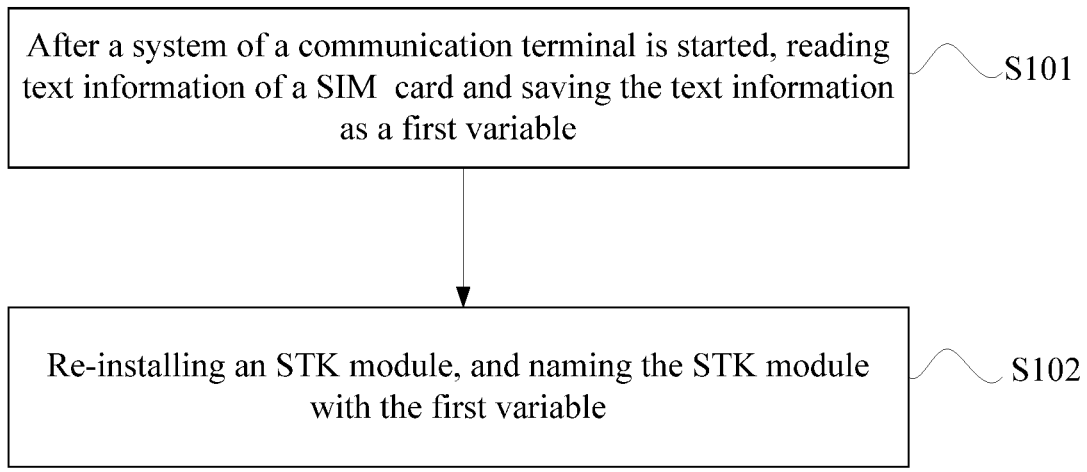
FIG. 1 is a flow chart illustrating a method for naming an STK module provided by an embodiment of the present disclosure.

Referring to FIG. 1, a flow chart is shown to illustrate a method of naming the STK module of the present disclosure. It should be noted that, when a substantially equivalent effect is achieved, the method may not be limited to follow the process sequence as shown in FIG. 1. As shown in FIG. 1, the method may include the following operations.

S101: after a system of a communication terminal is started, text information of a SIM card may be read and saved as a first variable.

Each time, after the communication terminal is powered on or restarted, the text information of the SIM card may be read automatically and saved as the first variable.

S102: an STK module may be re-installed and named using the first variable.

Generally, after the system of the communication terminal is started, a name of each function module may be loaded, and at the same time, the text information of the SIM card may be read. However, before completion of reading the text information of the SIM card, the name of each function module, including the STK function module, may have already been loaded. Therefore, after the communication terminal is powered on or restarted, the name of the STK module may be firstly loaded as a name that is automatically displayed, for example the name containing a key word of "SIM card." The SKT module may be re-installed during the operation of S102 and renamed using the first variable saved in S101 to replace the automatically displayed name when the system is started. This may guarantee the STK can be re-installed each time when the communication terminal is powered on or restarted, so that the STK module may be named using the first text information, which means the name may meet actual demands of the operators.

Figure 2:
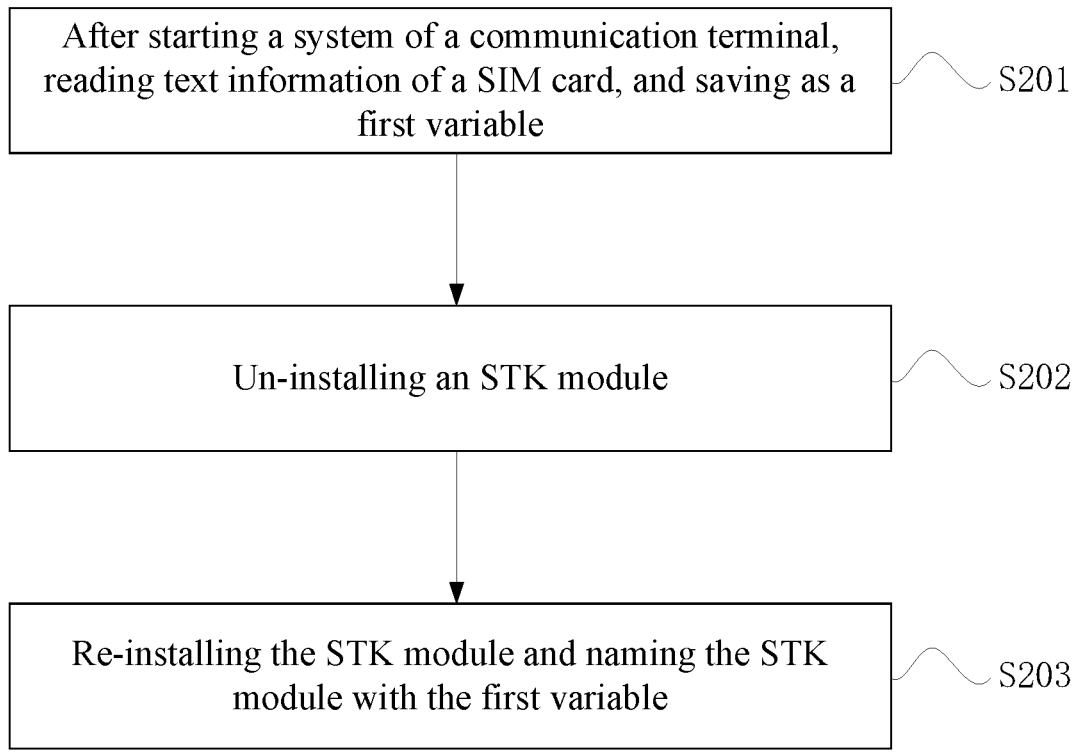
FIG. 2 is a flow chart illustrating another method for naming an STK module provided by an embodiment of the present disclosure.

Referring to FIG. 2, in another embodiment, to ensure a name of an STK module can be reloaded as characters set by an operator correctly, an operation of un-installing the STK module may be added in the present embodiment. To be specific, the method may include the following operations.

S201: after a system of a communication terminal is started, text information of a SIM card may be read and saved as a first variable.

S202: an STK module may be un-installed.

S203: the STK module may be re-installed and named using the first variable.

In the present solution, operations S201 and S203 correspond to the operations S101 and S102 of the previous embodiment, respectively, which will not be repeatedly described herein. After reading and saving the text information of the SIM card, the STK module may be un-installed, and then re-installed and renamed using the first variable. It may guarantee that the STK module may be renamed using the text information of the SIM card each time when the communication system is restarted.

To be specific, the text information may include SET UP MENU alphaID or EF_SUME.

Figure 3:
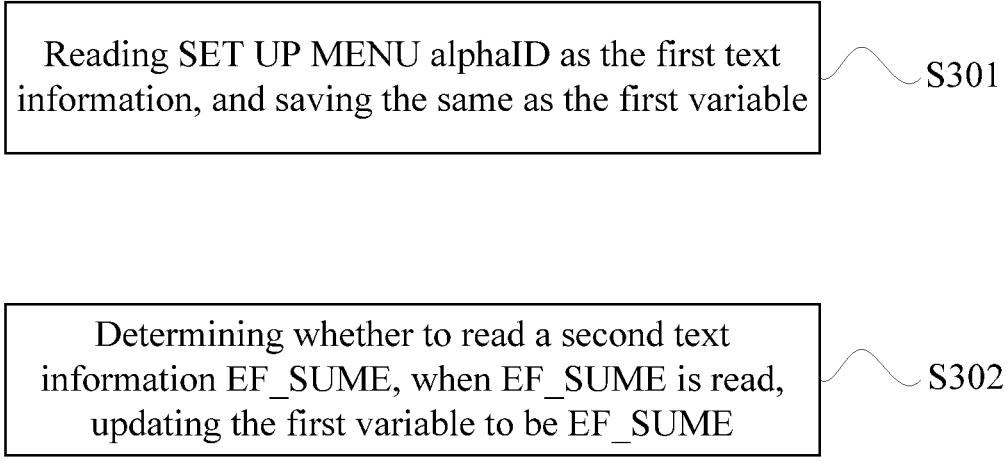
FIG. 3 is a partial flow chart illustrating still another method for naming an STK module provided by an embodiment of the present disclosure.

Referring to FIG. 3, in an embodiment, the text information may include SET UP MENU alphaID and EF_SUME at the same time. In this situation, reading and saving the text information of the SIM card described in S101 and S201 of the above embodiments may include the following operations.

S301: first text information of SET UP MENU alphaID may be read and saved as the first variable.

In the present embodiment, according to a setting of the reading sequence of the SIM card, generally, a file of which the text information is SET UP MENU alphaID may be read firstly, and a file of which the text information is EF_SUME may be read next. After reading the file of which the text information is SET UP MENU alphaID, an operation of S302 may be executed.

S302: it may be determined whether to read the second text information EF_SUME. When it is to be read, the first variable may be updated to be EF_SUME.

In the present embodiment, the second text information EF_SUME has higher priority than the first text information SET UP MENU alphaID. When the second text information EF_SUME is readable, the second text information EF_SUME may cover the SET UP MENU alphaID of the first variable in S301. The STK module may be renamed using the first variable saved with EF_SUME after the covering. It should be understood that, in other embodiments, under the same situation that the text information includes SET UP MENU alphaID and EF_SUME at the same time, when the first read text information is EF_SUME, the STK module may be renamed with EF_SUME directly, and it may be unnecessary to determine whether a text information of SET UP MENU alphaID is available.

Alternatively, in other embodiments, text information of the SIM card may be any characters other than SET UP MENU alphaID and/or EF_SUME, which is up to operator demand. The characters may be in a form or in a combination of the forms of English letters, Chinese characters, digits and underlines. It should be understood that, in the present disclosure, any character may be set to be a higher-grade attribute according to the operators, as long as text information contains the higher-grade character, the STK module may be renamed using the character.

To be specific, the operation of naming the STK module using the first variable refers to naming an entry menu of the STK function module. That is, the name of which the STK module shall use to face users.

Figure 4:
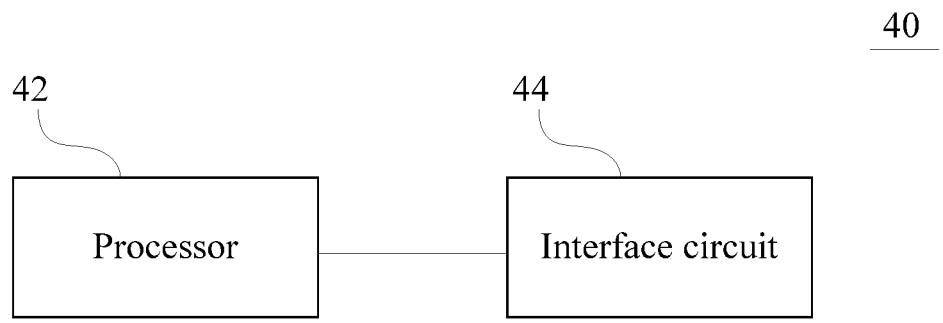
FIG. 4 is a structural diagram of a communication terminal provided by an embodiment of the present disclosure.

Referring to FIG. 4, a structural diagram of a communication terminal of an embodiment of the present disclosure is provided. In the present embodiment, the communication terminal 40 is the communication terminal of the above embodiments. The communication terminal 40 may include a processor 42 and an interface circuit 44 coupled with the processor 42. While the processor 42 is working, it may cooperate with the interface circuit 44 to execute related instructions to implement the methods described in the above embodiments. To be specific, the interface circuit 44 may be an interface connecting the communication terminal to a peripheral, such as a universal serial bus (USB) interface circuit, power interface circuit and the like, or may be other components that can cooperate with the processor 42.

Figure 5:
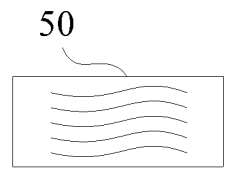
FIG. 5 is a structural diagram of an apparatus, which has a storage function, provided by an embodiment of the present disclosure.

Referring to FIG. 5, the present disclosure may further provide an apparatus 50, which has a storage function. Program data may be stored therein and executed to implement the methods as described by the above embodiments. To be specific, the apparatus with the storage function may be one of a personal computer, a server, an internet device, a USB flash click and the like.

The above description is only embodiments of the present disclosure, and should not limit the scope of the present disclosure. Any equivalent structural or process transformation based on the specification and appended figures of the present disclosure used directly or indirectly in other related fields should also be within the scope of the present disclosure.

What is claimed is:

1. A method of naming a subscriber identity module (SIM) tool kit (STK) module, wherein the method comprises:
    after a system of a communication terminal is started, reading text information of a SIM card and saving the text information as a first variable, wherein the text information comprises SET UP MENU alphaID or EF_SUME;
    after the text information is saved, un-installing the STK module; and
    re-installing the STK module and naming the STK module with the first variable;
    wherein before a completion of reading the text information of the SIM card, a name of the STK module is loaded as a name that is automatically displayed;
    after the STK module is un-installed, the STK module is re-installed and renamed with the first variable to replace the automatically displayed name such that the STK module is renamed using the text information of the SIM card each time when the system of a communication terminal is restarted.

2. The method according to claim 1, wherein the reading the text information of the SIM card and saving the text information as the first variable comprises:

reading SET UP MENU alphaID as first text information, and saving the same as the first variable; and determining whether to read second text information EF_SUME, and when the second text information EF_SUME is to be read, updating the first variable to be EF_SUME.

3. The method according to claim 1, wherein the reading the text information of the SIM card and saving the text information as the first variable comprises:

reading EF_SUME as first text information, and saving the same as the first variable.

4. The method according to claim 1, wherein the naming the STK module with the first variable comprises:

naming an entry menu of the STK function module with the first variable.

5. A communication terminal, comprising:

a processor and an interface circuit, wherein the processor is coupled with the interface circuit, and while working, the processor cooperates with the interface circuit to execute instructions to perform actions of:

reading text information of a subscriber identity module (SIM) card after a system of the communication terminal is started, and saving the text information as a first variable;

after the text information is saved, un-installing a subscriber identity module tool kit (STK) module; and re-installing an STK module and naming the STK module with the first variable;

wherein before a completion of reading the text information of the SIM card, a name of the STK module is loaded as a name that is automatically displayed;

after the STK module is un-installed, the STK module is re-installed and renamed with the first variable to replace the automatically displayed name such that the STK module is renamed using the text information of the SIM card each time when the system of a communication terminal is restarted.

6. The communication terminal according to claim 5, wherein the reading text information of the SIM card after the system of the communication terminal is started, and saving the text information as the first variable is followed by un-installing the STK module.

7. The communication terminal according to claim 5, wherein the text information comprises SET UP MENU alphaID or EF_SUME.

8. The communication terminal according to claim 5, wherein the reading text information of the SIM card and saving the text information as the first variable comprises:

reading SET UP MENU alphaID as first text information, and saving the same as the first variable; and determining whether to read second text information EF_SUME, and when the second text information EF_SUME is to be read, updating the first variable to be EF_SUME.

9. The communication terminal according to claim 5, wherein the reading text information of the SIM card and saving the text information as the first variable comprises:

reading EF_SUME as first text information, and saving the same as the first variable.

10. A medium having a storage function, wherein the medium has program data stored, and the program data is executed to perform actions of:

reading text information of a subscriber identity module (SIM) card after a system of a communication terminal is started, and saving the text information as a first variable;

after the text information is saved, un-installing a subscriber identity module tool kit (STK) module; and re-installing an STK module, and naming the STK module with the first variable;

wherein before a completion of reading the text information of the SIM card, a name of the STK module is loaded as a name that is automatically displayed;

after the STK module is un-installed, the STK module is re-installed and renamed with the first variable to replace the automatically displayed name such that the STK module is renamed using the text information of the SIM card each time when the system of a communication terminal is restarted.

11. The medium having the storage function according to claim 10, wherein the reading the text information of the SIM card after the system of the communication terminal is started, and saving the text information as the first variable is followed by un-installing the STK module.

12. The medium having the storage function according to claim 10, wherein the text information comprises SET UP MENU alphaID or EF_SUME.

13. The medium having the storage function according to claim 10, wherein the reading the text information of the SIM card and saving as the first variable comprises:

reading SET UP MENU alphaID as first text information, and saving the same as the first variable; and determining whether to read second text information EF_SUME, and when the second text information EF_SUME is to be read, updating the first variable to be EF_SUME.

14. The medium having the storage function according to claim 10, wherein the reading the text information of the SIM card and saving as the first variable is reading EF_SUME as first text information, and saving the EF_SUME as the first variable.

* * * * *